United States Patent [19]
Gach

[11] 3,855,877
[45] Dec. 24, 1974

[54] LOCKING KNOB
[75] Inventor: Donald R. Gach, La Verne, Calif.
[73] Assignee: Robert L. Gach, aka Kilo Engineering Company, La Verne, Calif.
[22] Filed: June 28, 1973
[21] Appl. No.: 374,798

Related U.S. Application Data
[63] Continuation-in-part of Ser. No. 250,280, May 4, 1972, abandoned.

[52] U.S. Cl.................. 74/531, 74/553, 116/115
[51] Int. Cl................................................ G05g 5/06
[58] Field of Search .............. 74/531, 553; 116/115; 188/60, 69

[56] References Cited
UNITED STATES PATENTS
2,845,145  7/1958  Lee................................. 74/531 X
2,879,673  3/1959  Passman ............................ 74/531
3,053,110  9/1962  Shalek ............................ 74/531 X Primary Examiner—Samuel Scott
Assistant Examiner—F. D. Shoemaker
Attorney, Agent, or Firm—Christie, Parker & Hale

[57] ABSTRACT

A knob for driving a rotatable shaft of a device and having a compact lock for securing the knob and shaft at a desired position. A locking member is mounted on the knob, and the member is movable with respect to the knob to drive braking pins or a similar braking means against a stationary portion of the device or knob assembly to lock the knob and shaft. The knob is especially useful on a turns-counting dial as used with devices such as miniature multi-turn potentiometers.

9 Claims, 16 Drawing Figures

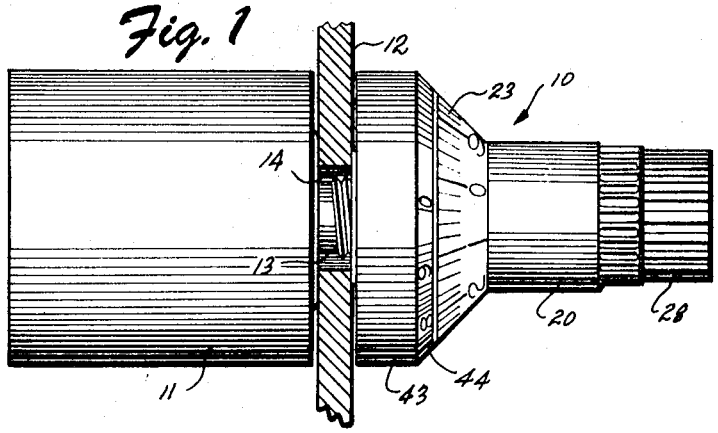
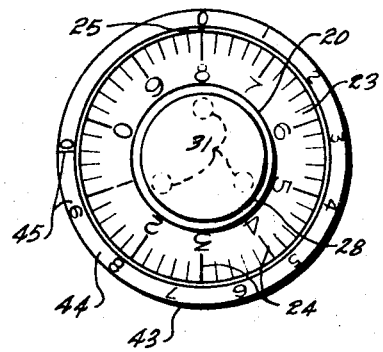
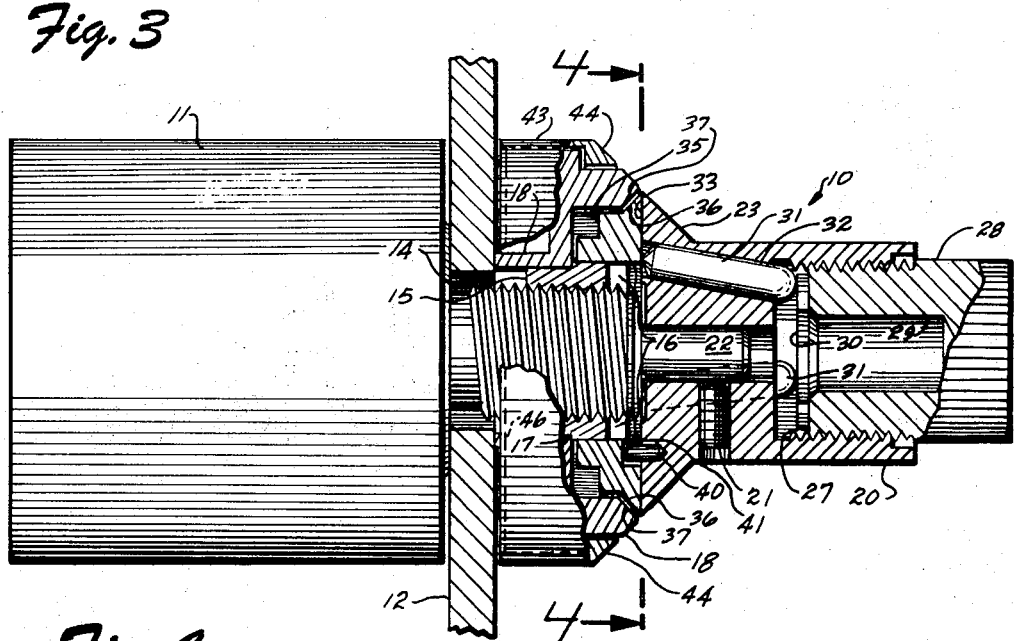
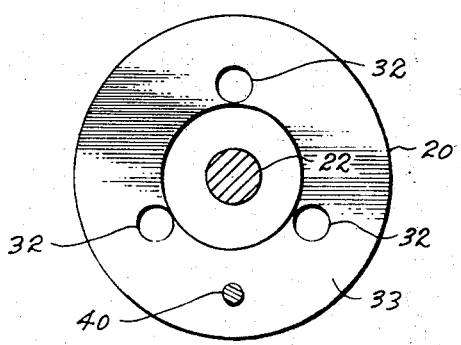

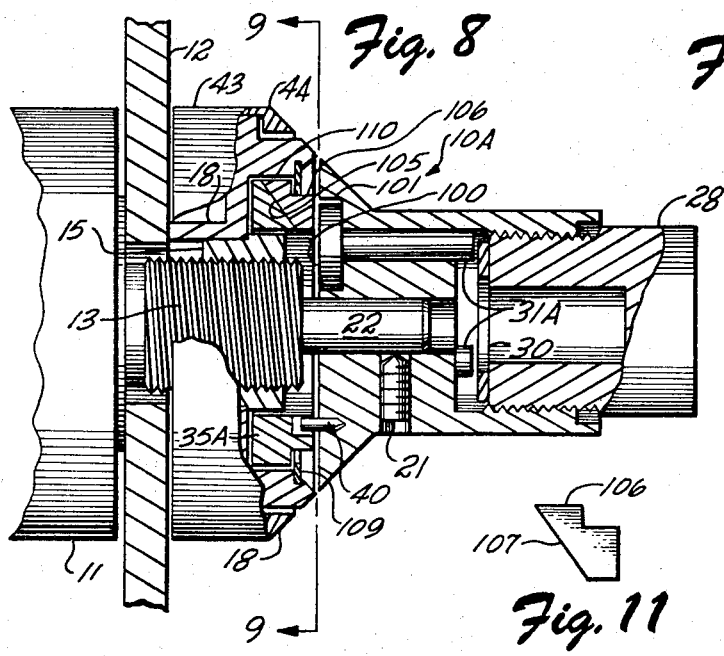
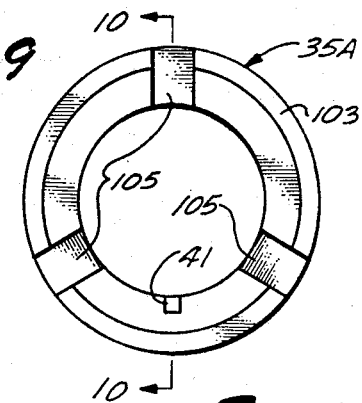
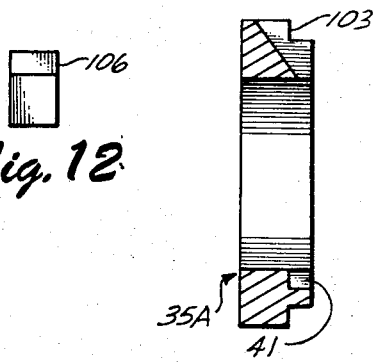
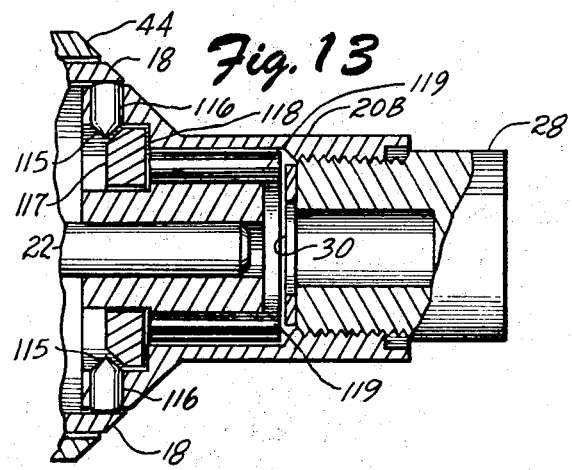
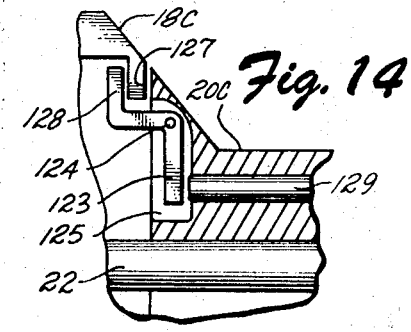
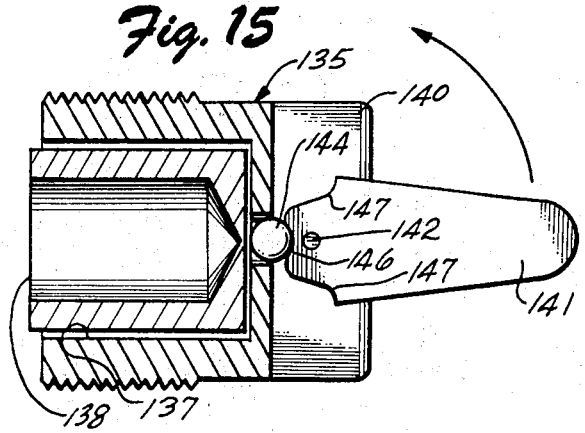
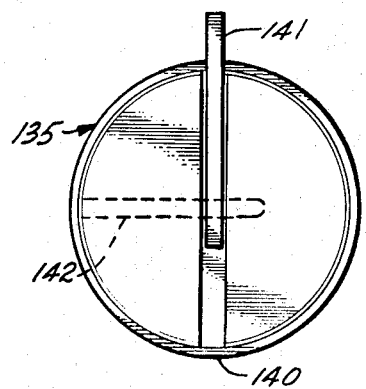

LOCKING KNOB

CROSS REFERENCE TO RELATED APPLICATION

This is a continuation-in-part of co-pending application Ser. No. 250,280 filed May 4, 1972 and now abandoned.

BACKGROUND OF THE INVENTION

Turns-counting dials for displaying the rotational position of a device such as a multi-turn potentiometer are known, and a satisfactory design is shown in U.S. Pat. No. 2,805,636 titled "Shaft Position Indicating Dial." These known dials typically include a locking arm or lever secured to a stationary portion of the dial and arranged to lock a rotary knob of the dial in a fixed position. The locking feature is particularly useful on calibration or setup adjustments which must be maintained in a set position and protected against inadvertent rotation.

These prior-art dials are in widespread use, and they are well suited to a variety of applications where ample panel space is available. They are not as satisfactory, however, in applications where a number of devices (such as miniature multi-turn potentiometers) are packed together on a panel, and each device requires a locking dial. This is so because the number of devices which can be mounted in a given panel space is limited by the size of the dials which are typically larger in diameter than many modern miniaturized rotary devices.

Small knobs of many types have been used in applications of the type just described, but they lack the locking feature which is often needed to insure that a desired rotational position is maintained. The locking knob of this invention provides a solution to this problem, and is herein disclosed in the context of a turns-counting dial for multi-turn devices. The invention is not limited to this application, however, and is equally useful in other styles of dial assemblies for fractional-turn, single-turn or multi-turn devices.

SUMMARY OF THE INVENTION

Briefly stated, the locking-knob assembly of this invention includes a base having a portion adapted for attachment to a device such as a potentiometer to be controlled by the knob assembly. The base may include an annular stator when the invention is used in a turns-counting dial. A knob is disposed adjacent the base, and is adapted to be rigidly secured to a shaft extending from the device to be controlled. A locking member is movably mounted on the knob. A braking means is disposed between the locking member and base, and is arranged to be driven by the locking member into frictional engagement with the base when the locking member is moved to a locking position.

BRIEF DESCRIPTION OF THE DRAWINGS

FIG. 1 is a side elevation of a turns-counting dial incorporating the lock of this invention, and shown in use on a panel-mounted potentiometer;

FIG. 2 is a front view of the dial shown in FIG. 1;

FIG. 3 is an enlarged sectional side elevation of the dial shown in FIG. 1;

FIG. 4 is a view on line 4—4 of FIG. 3 of a control knob used in the dial;

FIG. 8 is a side sectional elevation of a third alternative form of the invention;

FIG. 9 is a view on line 9—9 of FIG. 8 of a coupling ring;

FIG. 10 is a section on line 10-10 of FIG. 9;

FIG. 11 is a side elevation of a brake shoe;

FIG. 12 is a front view of the brake shoe shown in FIG. 11;

FIG. 13 is a side sectional elevation of a fourth alternative form of the invention;

FIG. 14 is a side sectional elevation of a fifth alternative form of the invention;

FIG. 15 is a side sectional elevation of an alternative form of a locking knob; and FIG. 16 is an end view taken from the right end of FIG. 15.

DESCRIPTION OF THE PREFERRED EMBODIMENTS

Figure 5:
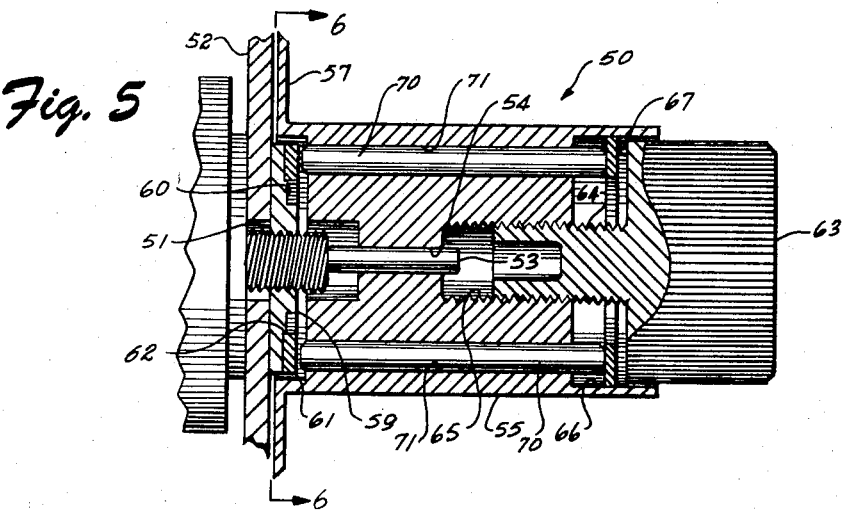
FIG. 5 is a side sectional elevation of an alternative form of the knob of this invention.

Referring to FIGS. 1–4, a turns-counting dial 10 and a rotary potentiometer 11 are secured together on opposite sides of a panel 12. Except for the locking mechanism to be described below, dial 10 is essentially a miniaturized version of a turns-counting dial disclosed in U.S. Pat. No. 2,805,636. The internal turns-counting mechanism of dial 10 may be substantially the same as that disclosed in this patent, and, for brevity, this portion of the assembly will not be described in detail.

Potentiometer 11 has an externally threaded mounting boss 13 extending therefrom through a hole 14 in panel 12. A mounting nut 15 is threaded on boss 13, and the nut has a pair of opposed notches 16 so it can be tightened by a conventional spanner wrench. Nut 15 has an outwardly extending annular flange 17, and the flange bears against a stationary annular base or stator 18 of dial 10. Nut 15 is tightened on boss 13 until stator 18 is securely clamped against panel 12 as shown in FIG. 3, and the potentiometer housing, panel and stator are thus secured together against relative rotation.

A control knob 20 is secured by a set screw 21 to a rotatable control shaft 22 extending from the mounting boss of potentiometer 11. The inner end of knob 20 is bezeled to define an inner dial 23 on which index marks 24 are displayed so the rotational position of shaft 22 can be read with respect to a stationary index mark or lubber line 25 on stator 18.

An enlarged internally threaded bore 27 is formed in the outer end of control knob 20, and a knurled locking member or knob 28 is threaded into the bore. The inner end of the locking knob has a drilled opening 29 to accommodate any overhang of potentiometer control shaft 22. A force-distributing washer 30 is disposed between the inner end of bore 27 and locking knob 28.

Three cylindrical pins 31 make a slip fit in mating bores 32 which extend from the inner end of bore 27 to a back face 33 of control knob 20. The axes of bores 32 are oriented at an angle to the rotational axis of control knob 20 so the radial separation of pins 31 from control shaft 22 increases as the pins extend toward back face 33.

A self-aligning coupling ring 35 is rotatably received in a space defined between stator 18, nut 15 and back face 33 of the control knob. The coupling ring has a tapered peripheral portion defining an annular braking surface 36 which is immediately adjacent a mating annular braking surface 37 formed on stator 18. Coupling ring 35 is dimensioned to have a slight axial freedom so the braking surfaces can be driven together when locking knob 28 is advanced inwardly to drive pins 31 against the front surface of the coupling ring.

A pin 40 is rigidly secured in back face 33 of control knob 20, and the pin extends into a mating opening 41 in the front face of coupling ring 35. The control knob and coupling ring are thus keyed together by pin 40 to rotate as a unit, but the coupling ring is free to move axially with respect to the knob.

A ring-shaped outer dial 43 is rotatably carried on stator 18, and has a bezeled surface 44 with index marks 45 to display the number of full turns through which the potentiometer shaft has been rotated. A closure disk 46 (shown in phantom in FIG. 3) is rigidly secured within the back end of outer dial 43, and the closure disk has a central opening to provide clearance for stator 18 and the potentiometer mounting boss. Appropriate gearing and a Geneva mechanism (not shown) are provided between coupling ring 35 and outer dial 43 to advance the outer dial one graduation for each 360° rotation of the control knob. This coupling mechanism is not shown in detail as it is fully described in the aforementioned U.S. Pat. No. 2,805,636.

In use, control knob 20 is rotated until the potentiometer is positioned at a desired setting. The control knob is then held stationary, and locking knob 28 is threaded inwardly to drive pins 31 against the front face of axially movable coupling ring 35. Continued rotation of the locking knob advances the pins and coupling ring until braking surfaces 36 and 37 are forced against each other to lock the coupling ring with respect to stator 18. The control knob and potentiometer shaft are then locked because the knob is rotationally keyed to the coupling ring by pin 40, and the potentiometer setting will be maintained against inadvertent rotation until braking surfaces 36 and 37 are disengaged by unthreading locking knob 28.

Mounting of the locking knob on the control knob achieves a substantial reduction in size and complexity of the overall dial assembly. Known turns-counting dials typically have a braking means mounted on the stator portion of the dial, and this arrangement limits the extent to which the dial may be miniaturized. The arrangement herein disclosed avoids this problem, and provides locking by simple and inexpensive mechanical arrangement which utilizes the existing coupling ring as a braking member.

Figure 6:
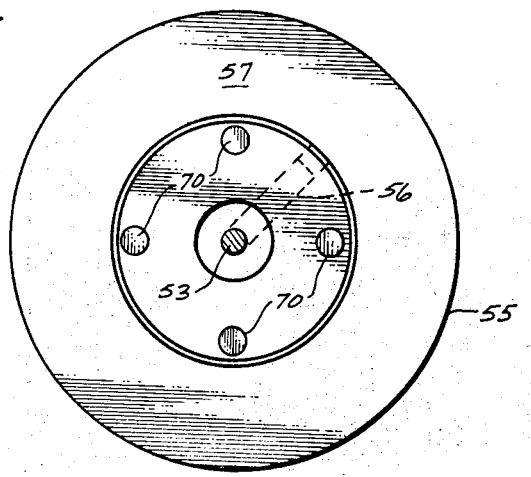
FIG. 6 is a view on line 6—6 of FIG. 5.

An alternative embodiment of the invention is shown in FIGS. 5 and 6 which illustrate a knob assembly 50 which is not of the turns-counting type. As in the embodiment described above, a threaded mounting boss 51 extends from a component such as a potentiometer through an opening in a panel 52, and a control shaft 53 extends from the boss. The control shaft is received in a central bore 54 of a control knob 55, and the shaft and knob are rigidly secured together by a set screw 56 (shown in phantom in FIG. 6). An outwardly extending annular flange 57 is integrally formed at the inner end of the control knob, and graduations or index marks (not shown) are displayed on the flange to show rotational position with respect to the panel.

A nut 59, having slots or notches 60 to accommodate a spanner wrench, is threaded on boss 51 against panel 52 to secure the boss and associated potentiometer or similar component to the panel. A braking ring 61 is seated on the front surface of nut 59 over a shoulder 62 on the nut.

A knurled locking member or knob 63 has a threaded shank 64 fitted into a mating threaded bore 65 within control knob 55. The outer end of the control knob has an enlarged opening 66 which receives the knurled end of the locking knob, and a force-distributing washer 67 is fitted in the opening between the locking knob and control knob.

Four cylindrical pins 70 make a slip fit within mating longitudinal bores 71 through control knob 55. When the control knob has been rotated to a desired position, it is held against further rotation and locking knob 63 is advanced to drive pins 70 against braking ring 61 which in turn frictionally engages stationary nut 59 to lock the knob. The control knob is unlocked by simply unthreading locking knob 63 to release the force on pins 70.

Figure 7:
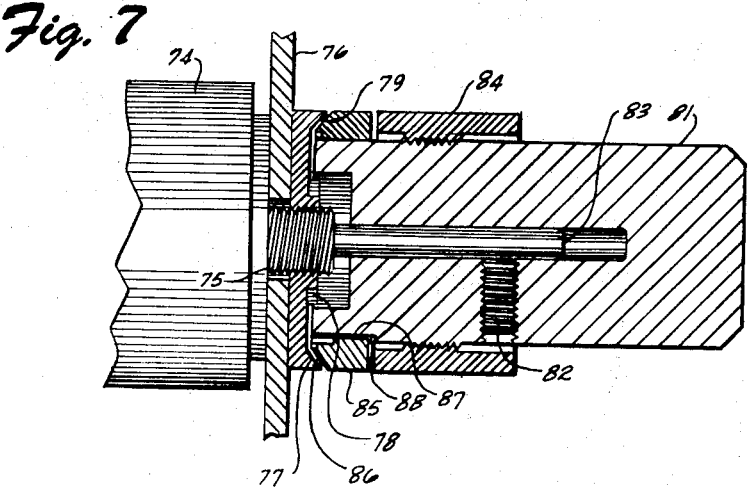
FIG. 7 is a side sectional elevation of a second alternative form of the invention.

A second alternative embodiment of the invention is shown in FIG. 7. A component 74 such as a potentiometer has a threaded boss 75 extending through an opening in a panel 76. A locking nut 77 is threaded on the boss to secure component 74 against the panel. Nut 77 has notches 78 for a spanner wrench, and an annular, outwardly tapered braking surface 79 is formed on the periphery of the front surface of the nut.

A control knob 81 is secured by a set screw 82 to a control shaft 83 extending from component 74. A cylindrical locking member or knob 84 formed as a hollow sleeve is internally threaded to mate with external threads on control knob 81. A braking ring 85 is fitted over the inner end of the control knob and is axially movable thereon. The inner end of the braking ring is tapered to define a braking surface 86 which mates with braking surface 79 on nut 77. The braking ring and control knob are rotationally secured together by a key 87 which extends inwardly from the braking ring into mating engagement with a slot 88 in the surface of knob 81.

When control knob 81 has been set at a desired position, the knob is held against further rotation and locking sleeve 84 is rotated along the control-knob threads to drive braking ring 85 against nut 77. In this position, braking surfaces 79 and 86 are frictionally engaged to prevent further rotation of the control knob. The knob is released simply by rotating locking sleeve 84 in the opposite direction to release the pressure on braking ring 85.

A third alternative embodiment of the invention is shown in FIG. 8. This embodiment is similar in many respects to the version of the invention shown in FIG. 3, and components which are identical in the two versions are shown with the same component numbers in FIGS. 3 and 8.

Turns-counting dial 10A in FIG. 8 has a control knob 20A carrying a threaded locking knob 28 and force-distributing washer 30 just as already described. Three locking pins 31A (only one of which is fully shown in FIG. 8) are fitted into longitudinal bores in the control knob to be movable in a direction generally parallel to the axis of the knob. Each pin 31A has an enlarged circular head 100 seated in a recess 101 in the inner face of the control knob.

A modified coupling ring 35A is rotatably received in a space defined between stator 18, nut 15 and the back or inner face of the control knob. Coupling ring 35A is shown in detail in FIGS. 9 and 10, and includes an inwardly stepped annular shoulder 103. Three sloping notches 105 are equally spaced around the front face of the coupling ring, and a brake shoe 106 (FIGS. 8, 11 and 12) having a mating sloping face 107 makes a slip fit in each notch. The coupling ring and brake shoes are made captive within stator 18 by a split annular retaining ring 109 (FIG. 8) fitted into an annular groove in the stator.

When control knob 20A is to be locked against further rotation, locking knob 28 is rotated to drive washer 30 against pins 31A. The pins are in turn driven against brake shoes 106 which slide radially outwardly along sloping notches 105 into frictional engagement with an annular braking surface 110 of stator 18. The primary braking force exerted by the brake shoes is thus directed radially of shaft 22, rather than parallel to the shaft.

A variation of the embodiment just described is shown in FIG. 13. In this embodiment, a plurality of brake pins 115 make a slip fit in radially oriented bores 116 in a control knob 20B. The inner ends of the pins are tapered, and bear against a ring 117 having a mating tapered or chamfered surface, the ring being fitted in a recess 118 in the rear or inner face of the control knob. Actuating pins 119 are driven against brake pins 115 by rotating locking knob 28, and the brake pins move radially outwardly into frictional engagement with the inner surface of stator 18. Alternatively, the actuating pins can be lengthened and tapered to make direct actuating contact with the brake pins.

In the embodiment shown in the partial view of FIG. 14, braking is accomplished by a plurality of crank pins 123 each mounted on a pivot pin 124 in a slotted recess 125 in the inner face of a control knob 20C. A modified stator 18C has an inwardly extending flange 127 positioned between the inner face of control knob 20C and a radially outwardly extending leg 128 of each crank pin 123. Rotation of the locking knob as described above drives pins 129 into contact with the crank pins, and squeezes stator flange 127 between the inner face of the dial and crank-pin legs 128 to effect the desired braking action.

The locking-dial embodiments described above use a locking knob which is rotated to control locking action. FIGS. 15 and 16 show an alternative form of a locking knob 135 which can be substituted for the rotatable locking knob already described.

Locking knob 135 is generally cylindrical, and is externally threaded to be fitted into the internally threaded outer end of the associated control knob. Alternatively, the external threads may be deleted, and the locking knob may be held in place by a pin or set screw, as rotation of the locking knob is unnecessary to effect locking action. Knob 135 has a cylindrical recess 137 extending longitudinally from its inner face, and a hollow cylindrical plug 138 makes a slip fit in the recess.

A radial slot 140 is cut through a portion of the outer end of knob 135, and a locking lever 141 is pivotally supported on a pivot pin 142 secured to the knob. A circular opening 143 extends from the inner face of radial slot 140 to recess 137, and a ball 144 makes a slip fit in the opening.

The inner end of locking lever 141 defines a cam surface having a central portion 146 which is closely spaced from pivot pin 142, and a pair of opposed locking surfaces 147 which are more distantly spaced from the pivot pin. When the locking lever is in the position shown in FIG. 15, ball 144 is relatively close to pivot pin 142, permitting plug 138 to be fully retracted within recess 137. When locking lever 141 is moved in either direction about the pivot pin (as shown in FIG. 16), locking surfaces 147 urge ball 144 against plug 138, and the plug is moved away from the pivot pin and against the brake-actuating pins described with reference to the several embodiments discussed above. Locking of the control knob is thus accomplished without rotation of the locking knob.

There has been described an improved locking knob which is particularly useful in miniature dial assemblies. The locking mechanism finds special utility in turns-counting dials which must be of minimum size to enable the mounting of a number of rotary components such as potentiometers within a limited panel space.

What is claimed is:

1. A locking knob assembly for driving a rotatable shaft of a device, comprising:
    a base having a portion adapted for attachment to the device to be stationary with respect to the shaft;
    a knob disposed adjacent the base and adapted to be rigidly secured to the shaft to be rotatable with respect to the base;
    a locking member mounted on the knob to be movable with respect to the knob toward and away from the base; and
    braking means disposed between the locking member and base, and arranged to be driven by the locking member into frictional engagement with the base when the locking member is moved with respect to the knob whereby the knob and shaft can be secured at a desired rotational position.

2. The assembly defined in claim 1 in which the locking member is in threaded engagement with the knob to be rotatable coaxially with the knob.

3. The assembly defined in claim 2 in which the knob has an open end remote from the device, and the locking member is threaded into the open end, the braking means including a pin mounted in the knob to be axially movable, the pin extending into the open end to be forced toward the base as the locking member is advanced into the knob.

4. The assembly defined in claim 2 in which the locking member is a sleeve fitted over the knob, and in which the braking means includes an axially movable ring fitted over the knob between the sleeve and base.

5. The assembly defined in claim 1 wherein the braking means moves radially with respect to the shaft into frictional engagement with the base when the locking member is moved to a locking position.

6. The assembly defined in claim 1 wherein the braking means includes a pin slidably mounted in the knob to be axially movable, the pin being driven toward the base when the locking member is moved to a locking position to drive another portion of the braking means into frictional engagement with the base.

7. In a turns-counting dial assembly having a stationary base adapted for attachment to a device, and having a rotatable knob adapted for attachment to a rotatable shaft of the device, an improved locking mechanism comprising:
- a locking member threaded into an open end of the knob to be movable toward and away from the base, and
- a braking means disposed between the locking member and base, and arranged to be driven into engagement with the base by the locking member to secure the knob and shaft with respect to the base.

8. The improvement defined in claim 7 in which the braking means comprises a plurality of pins disposed in the knob to be axially movable, the pins being disposed between the locking member and base.

9. The improvement defined in claim 8 in which the turns-counting dial includes an axially movable coupling ring which is rotationally keyed to the knob, the pins being disposed between the locking member and coupling ring, whereby the locking member can be advanced to drive the pins against the coupling ring to force the coupling ring into frictional locking engagement with the base.

* * * * *